(12) United States Patent
Dong

(10) Patent No.: US 11,894,991 B2
(45) Date of Patent: Feb. 6, 2024

(54) RATE NEGOTIATION METHOD AND APPARATUS THEREOF

(71) Applicant: Huawei Technologies Co., Ltd., Shenzhen (CN)

(72) Inventor: Ping Dong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 17/338,311

(22) Filed: Jun. 3, 2021

(65) Prior Publication Data
US 2021/0297325 A1    Sep. 23, 2021

Related U.S. Application Data

(63) Continuation of application No. PCT/CN2019/122217, filed on Nov. 29, 2019.

(30) Foreign Application Priority Data

Dec. 3, 2018 (CN) .......................... 201811464947.2

(51) Int. Cl.
*H04B 10/25* (2013.01)
*H04L 41/5006* (2022.01)
(Continued)

(52) U.S. Cl.
CPC ..... *H04L 41/5006* (2013.01); *H04B 10/2575* (2013.01); *H04B 10/25753* (2013.01); *H04B 10/6932* (2013.01); *H04W 28/22* (2013.01)

(58) Field of Classification Search
CPC .......... H04B 10/25753; H04B 10/6932; H04L 1/0015; H04L 1/0002; H04W 28/22
See application file for complete search history.

(56) References Cited

U.S. PATENT DOCUMENTS 4,890,316 A  * 12/1989  Walsh .................... H04M 11/06
                                                                    370/282
5,617,419 A  *  4/1997  Christensen ....... H04Q 11/0478
                                                                    370/506
(Continued)

FOREIGN PATENT DOCUMENTS

CN            101990136 A        3/2011
CN            102065343 A        5/2011
(Continued)

OTHER PUBLICATIONS

Yu Xiao-Shan et al., "The Optical Interconnection Network for Cloud Computing Data Centers:State of the Art and Future Research," vol. 38 No. 11, total 22 pages (2015). With English abstract.

*Primary Examiner* — Tanya T Motsinger
(74) *Attorney, Agent, or Firm* — Leydig, Voit & Mayer, Ltd,

(57) ABSTRACT

A rate negotiation method is provided. A first device switches a fiber transmission rate of a first port of the first device to a first fiber transmission rate based on a preset switching direction within a rotation period of a first fiber transmission rate set. The first device sends a negotiation packet to a second device through the first port of the first device within a duration of the first fiber transmission rate. If a response packet is received from the second device through the first port of the first device within the duration of the first fiber transmission rate, the first port of the first device is controlled to communicate with the second device based on the first fiber transmission rate.

20 Claims, 5 Drawing Sheets

(51) Int. Cl.
*H04B 10/2575* (2013.01)
*H04B 10/69* (2013.01)
*H04W 28/22* (2009.01)

(56) References Cited

U.S. PATENT DOCUMENTS

| | | | | |
|---|---|---|---|---|
| 5,935,213 | A * | 8/1999 | Rananand | H04L 49/3081 |
| | | | | 709/200 |
| 6,049,535 | A * | 4/2000 | Ozukturk | H04W 52/52 |
| | | | | 375/E1.006 |
| 6,094,418 | A * | 7/2000 | Soumiya | H04L 12/5602 |
| | | | | 370/231 |
| 6,226,265 | B1 * | 5/2001 | Nakamichi | H04L 12/5602 |
| | | | | 370/235 |
| 6,246,695 | B1 * | 6/2001 | Seazholtz | H04M 11/062 |
| | | | | 370/480 |
| 6,625,210 | B1 * | 9/2003 | Boissel | H04L 1/0002 |
| | | | | 370/236 |
| 6,647,058 | B1 * | 11/2003 | Bremer | H04L 1/002 |
| | | | | 375/225 |
| 7,684,477 | B1 * | 3/2010 | Vijayaraghavan | H04L 1/0002 |
| | | | | 375/225 |
| 8,774,206 | B2 | 7/2014 | Dropps et al. | |
| 8,929,262 | B2 * | 1/2015 | Feuerstraeter | H04L 1/0002 |
| | | | | 370/216 |
| 2004/0252668 | A1 * | 12/2004 | Ozukturk | H04B 1/7103 |
| | | | | 375/E1.006 |
| 2007/0248009 | A1 * | 10/2007 | Petersen | H04L 12/4633 |
| | | | | 370/412 |
| 2008/0037420 | A1 * | 2/2008 | Tang | H04L 69/163 |
| | | | | 370/231 |
| 2010/0279653 | A1 * | 11/2010 | Poltorak | H04M 15/00 |
| | | | | 455/410 |
| 2011/0170410 | A1 * | 7/2011 | Zhao | H04W 28/02 |
| | | | | 370/232 |
| 2014/0161438 | A1 | 6/2014 | In De Betou et al. | |
| 2020/0374069 | A1 * | 11/2020 | Gomi | H04L 41/145 |
| 2021/0184785 | A1 * | 6/2021 | Small | H04L 1/0002 |
| 2021/0185704 | A1 * | 6/2021 | Abedini | H04W 72/541 |
| 2021/0297325 | A1 * | 9/2021 | Dong | H04B 10/6932 |
| 2022/0123972 | A1 * | 4/2022 | Chen | H04L 25/14 |

FOREIGN PATENT DOCUMENTS

| | | |
|---|---|---|
| CN | 102136875 A | 7/2011 |
| CN | 103124195 A | 5/2013 |
| CN | 103518381 A | 1/2014 |
| EP | 2770655 A1 | 8/2014 |
| WO | 2011119897 A2 | 9/2011 |

* cited by examiner

RATE NEGOTIATION METHOD AND APPARATUS THEREOF

CROSS-REFERENCE TO RELATED APPLICATIONS

This application is a continuation of International Application No. PCT/CN2019/122217, filed on Nov. 29, 2019, which claims priority to Chinese Patent Application No. 201811464947.2, filed on Dec. 3, 2018. The disclosures of the aforementioned applications are hereby incorporated by reference in their entireties.

TECHNICAL FIELD

Embodiments of this application relate to the field of communications technologies, and specifically, to a rate negotiation method and an apparatus thereof.

BACKGROUND

The common public radio interface (CPRI) standard is a standard jointly published by a plurality of companies in the communications industry, and specifies a key interface between a radio equipment controller (REC) and radio equipment (RE) of a radio base station. Based on the CPRI standard, universality of an interface between a baseband unit and a radio frequency unit can be improved, and interconnection between a baseband and a radio frequency module that are from different manufacturers can also be implemented. The REC and the RE are usually connected by using a fiber or a cable. With evolution of technologies and increasing demand of bandwidth, a fiber rate is increasing. To be compatible with inventory devices, the REC or the RE generally supports a plurality of fiber transmission rates. The REC can communicate with the RE normally only when a fiber transmission rate of the REC is consistent with a fiber transmission rate of the RE.

The RE is generally a dumb terminal, the only control manner of the RE is to transmit control information by using a fiber, and a fiber transmission rate of the RE cannot be set in a manual configuration manner to enable the RE to be controlled. Therefore, an automatic rate negotiation method is required, to enable the fiber transmission rate of the REC to be consistent with the fiber transmission rate of the RE.

Currently, an automatic rate negotiation method exists, in which a rate negotiation is divided into two phases: an initial negotiation and a second negotiation. During the initial negotiation, a rate negotiation solution specified in the CPRI standard is used. The REC switches from a low fiber transmission rate to a high fiber transmission rate based on a rate capability of the REC, and each fiber transmission rate is kept for 4 s. The RE switches from a high fiber transmission rate to a low fiber transmission rate, and each fiber transmission rate is kept for 1 s. In this way, the REC and the RE perform reverse rate rotation. In addition, because the rates are kept for different time, theoretically, the REC and the RE may experience a same fiber transmission rate. In addition, for a rate negotiation between the two REs, upper-level RE and lower-level RE need to be distinguished from each other. For the lower-level RE, the upper-level RE is also based on rate rotation similar to that between the REC and the RE, so that the upper-level RE and the lower-level RE can negotiate a consistent rate. An identity of the upper-level RE is obtained after the upper-level RE is connected to the REC. In this method, identities of the REC and the RE need to be determined, and whether the RE is upper-level RE or lower-level RE needs to be distinguished. Therefore, a rate negotiation for an entire link is performed in sequence, and an entire rate negotiation takes a relatively long time.

SUMMARY

A technical problem to be resolved in embodiments of this application is to provide a rate negotiation method and an apparatus thereof, so that devices can perform fiber transmission rate negotiation in parallel, to effectively shorten rate negotiation duration.

A first aspect of the embodiments of this application provides a rate negotiation method, including:

A first device switches a fiber transmission rate of a first port of the first device to a first fiber transmission rate based on a preset switching direction within a rotation period of a first fiber transmission rate set. The first fiber transmission rate set is a fiber transmission rate set of the first device, and the first fiber transmission rate set includes the first fiber transmission rate.

The first device sends a negotiation packet to a second device adjacent to the first device through the first port of the first device within duration of the first fiber transmission rate. The duration of the first fiber transmission rate is greater than or equal to a sum of a sum of duration of all fiber transmission rates before the fiber transmission rate is switched to the first fiber transmission rate and a preset negotiation time.

If a response packet is received from the second device through the first port of the first device within the duration of the first fiber transmission rate, the first device controls the first port of the first device to communicate with the second device based on the first fiber transmission rate.

The first fiber transmission rate set is a set of fiber transmission rates supported by the first terminal. The first terminal may be a REC, or may be RE.

If the duration of the first fiber transmission rate is equal to the sum of the sum of duration of all fiber transmission rates before the fiber transmission rate is switched to the first fiber transmission rate and the preset negotiation time, duration of the fiber transmission rates in the first fiber transmission rate set forms a geometric progression.

According to the first aspect of the embodiments of this application, the first device switches to the first fiber transmission rate based on the preset switching direction, and the duration of the first fiber transmission rate is greater than or equal to the sum of the sum of duration of all fiber transmission rates before the fiber transmission rate is switched to the first fiber transmission rate and the preset negotiation time, so that a probability of fiber transmission rate negotiation success can be increased, to ensure that the first device completes fiber transmission rate negotiation within the rotation period of the first fiber transmission rate set. Any device in a topology switches a fiber transmission rate based on the preset switching direction. In this way, adjacent devices perform rate switching in a same direction, so that a fiber transmission rate between the adjacent devices can be successfully negotiated. Devices in the topology can perform fiber transmission rate negotiation in parallel, to effectively shorten rate negotiation duration.

The first aspect of the embodiments of this application is applicable to any network topology, and a location of a device in the topology is not limited, so that system complexity can be reduced, and system reliability and network adaptability can be improved.

In a possible implementation, the preset switching direction is related to an arrangement order of the fiber transmission rates within the rotation period of the first fiber transmission rate set, and in the preset switching direction, switching is performed from an $i^{th}$ fiber transmission rate to an $(i+1)^{th}$ fiber transmission rate within the rotation period of the first fiber transmission rate set, or from an $(i+1)^{th}$ fiber transmission rate to an $i^{th}$ fiber transmission rate within the rotation period of the first fiber transmission rate set, where i is an integer greater than or equal to 1. The fiber transmission rates within the rotation period of the fiber transmission rate set may be arranged in ascending or descending order of fiber transmission rate values, or may be arranged in any order.

In a possible implementation, the first device switches a fiber transmission rate of a second port of the first device to a second fiber transmission rate based on the preset switching direction within the rotation period of the first fiber transmission rate set, where the first fiber transmission rate set includes the second fiber transmission rate, and sends a negotiation packet to a third device adjacent to the first device through the second port of the first device within duration of the second fiber transmission rate. The duration of the second fiber transmission rate is greater than or equal to a sum of a sum of duration of all fiber transmission rates before the fiber transmission rate is switched to the second fiber transmission rate and the preset negotiation time. If a response packet is received from the third device through the second port of the first device within the duration of the second fiber transmission rate, the first device controls the second port of the first device to communicate with the third device based on the second fiber transmission rate.

When the first device is the REC, the REC may be adjacent to a plurality of REs, and may perform fiber transmission rate negotiation with the plurality of REs in parallel, to effectively shorten rate negotiation duration. When the first device is the RE, the RE may be adjacent to the REC, or may be adjacent to a plurality of REs. Fiber transmission rate negotiation may also be performed in parallel, to effectively shorten rate negotiation duration. In addition, the network topology and the location of the device in the topology are not limited, so that system complexity can be reduced, and system reliability and network adaptability can be improved.

In a possible implementation, the second fiber transmission rate is the same as the first fiber transmission rate, so that devices adjacent to the first device use a same fiber transmission rate. When the first device is the REC, the REC conveniently and simply manages RE adjacent to the REC.

In a possible implementation, the second fiber transmission rate is different from the first fiber transmission rate, so that each device adjacent to the first device uses a different fiber transmission rate, and bandwidth of each device can be fully utilized.

In a possible implementation, within duration of a third fiber transmission rate, if the first device receives a negotiation packet from a fourth device adjacent to the first device through a third port of the first device, and successfully decodes the negotiation packet, the first device controls the third port of the first device to communicate with the fourth device based on the third fiber transmission rate. The duration of the third fiber transmission rate is greater than or equal to a sum of a sum of duration of all fiber transmission rates before the fiber transmission rate is switched to the third fiber transmission rate and the preset negotiation time. The first fiber transmission rate set includes the third fiber transmission rate. The first device sends a response packet to the fourth device through the third port of the first device. In addition to sending a negotiation packet to a device adjacent to the first device to perform fiber transmission rate negotiation, the first device may further receive a negotiation packet from the device adjacent to the first device to perform fiber transmission rate negotiation. In other words, any device in the topology may send a negotiation packet to an adjacent device, or may receive a negotiation packet from the adjacent device without determining an identity of each device. This is flexible.

The third fiber transmission rate may be the same as or different from the first fiber transmission rate.

In a possible implementation, when the first device is the REC, the first device obtains a second fiber transmission rate set, where the second fiber transmission rate set is a fiber transmission rate set of the second device, determines a reference fiber transmission rate between the first device and the second device based on the second fiber transmission rate set, and sends the reference fiber transmission rate to the second device. The reference fiber transmission rate is an intersection set of the first fiber transmission rate set and the second fiber transmission rate set. This manner may be performed before a formal negotiation. The REC sends the reference fiber transmission rate to the second device, so that the second device stores the reference fiber transmission rate, and when the second device starts after a system is reset, the reference fiber transmission rate is kept for a period of time, and the second device performs rate negotiation with the REC.

Further, when the first device is the REC, the REC may obtain a fiber transmission rate set of each RE in the topology, set a reference fiber transmission rate for each RE based on the fiber transmission rate set of each RE, and send a corresponding reference fiber transmission rate to each RE. In this way, each RE receives and stores the corresponding reference fiber transmission rate, and when the RE starts after the system is reset, the reference fiber transmission rate is kept for a period of time, and the RE performs rate negotiation. This can reduce a time required for rate negotiation after the system is reset.

In a possible implementation, after determining the reference fiber transmission rate, the first device may determine duration of the reference fiber transmission rate. The duration of the reference fiber transmission rate may be obtained through table lookup, or may be independently set by the first device. It is only required that the duration of the reference fiber transmission rate be greater than or equal to a sum of duration of all fiber transmission rates before the reference fiber transmission rate plus the preset negotiation time.

Within the duration of the reference fiber transmission rate, if the first device receives a negotiation packet from the second device through the first port of the first device, and successfully decodes the negotiation packet, the first device controls the first port of the first device to communicate with the second device based on the reference fiber transmission rate. Within the duration of the reference fiber transmission rate, if the first device does not receive a negotiation packet from the second device through the first port of the first device, or fails to decode the negotiation packet, the first device performs, based on the first fiber transmission rate set, a step of switching the fiber transmission rate of the first port of the first device to the first fiber transmission rate based on the preset switching direction. In other words, if the reference fiber transmission rate can be successfully negotiated, the reference fiber transmission rate is directly used for communication. If the reference fiber transmission rate fails to be negotiated, fiber transmission rate negotiation is performed based on the rotation period.

A second aspect of the embodiments of this application provides a first device, and the first device has a function of implementing the method provided in the first aspect. The function may be implemented by hardware, or may be implemented by hardware executing corresponding software. The hardware or software includes one or more modules corresponding to the function.

In a possible implementation, the first device includes a processing unit and a transceiver unit. The processing unit is configured to switch a fiber transmission rate of a first port of the first device to a first fiber transmission rate based on a preset switching direction within a rotation period of a first fiber transmission rate set. The first fiber transmission rate set is a fiber transmission rate set of the first device, and the first fiber transmission rate set includes the first fiber transmission rate. The transceiver unit is configured to send a negotiation packet to a second device adjacent to the first device through the first port of the first device within duration of the first fiber transmission rate. The duration of the first fiber transmission rate is greater than or equal to a sum of a sum of duration of all fiber transmission rates before the fiber transmission rate is switched to the first fiber transmission rate and a preset negotiation time. The processing unit is further configured to: if the transceiver unit receives a response packet from the second device through the first port of the first device within the duration of the first fiber transmission rate, control the first port of the first device to communicate with the second device based on the first fiber transmission rate.

In a possible implementation, the first device includes a processor, a transceiver, and a memory. The memory stores a computer program, the computer program includes program instructions, and the processor is configured to invoke program code to perform the following operations: switching a fiber transmission rate of a first port of the first device to a first fiber transmission rate based on a preset switching direction within a rotation period of a first fiber transmission rate set, where the first fiber transmission rate set is a fiber transmission rate set of the first device, and the first fiber transmission rate set includes the first fiber transmission rate; controlling the transceiver to send a negotiation packet to a second device adjacent to the first device through the first port of the first device within duration of the first fiber transmission rate, where the duration of the first fiber transmission rate is greater than or equal to a sum of a sum of duration of all fiber transmission rates before the fiber transmission rate is switched to the first fiber transmission rate and a preset negotiation time; and if the transceiver receives a response packet from the second device through the first port of the first device within the duration of the first fiber transmission rate, controlling the first port of the first device to communicate with the second device based on the first fiber transmission rate.

Based on a same concept, for a problem-resolving principle and beneficial effects of the first device, refer to the method and beneficial effects brought by the method in the first aspect. Therefore, for implementation of the apparatus, refer to the implementation of the method. Repeated parts are not described again.

A third aspect of the embodiments of this application provides a computer-readable storage medium. The computer-readable storage medium stores instructions. When the instructions are run on a computer, the computer is enabled to perform the method according to the first aspect.

A fourth aspect of the embodiments of this application further provides a computer program product including instructions. When the computer program product runs on a computer, the computer is enabled to perform the method according to the first aspect.

A fifth aspect of the embodiments of this application provides a rate negotiation method, including:

A second device switches a fiber transmission rate of a first port of the second device to a first fiber transmission rate based on a preset switching direction within a rotation period of a second fiber transmission rate set. The second fiber transmission rate set is a fiber transmission rate set of the second device, and the second fiber transmission rate set includes the first fiber transmission rate.

Within duration of the first fiber transmission rate, if the second device receives a negotiation packet from a first device adjacent to the second device through the first port of the second device, and successfully decodes the negotiation packet, the second device controls the first port of the second device to communicate with the first device based on the first fiber transmission rate. The duration of the first fiber transmission rate is greater than or equal to a sum of a sum of duration of all fiber transmission rates before the fiber transmission rate is switched to the first fiber transmission rate and a preset negotiation time.

The second device sends a response packet to the first device through the first port of the second device.

The second fiber transmission rate set is a set of fiber transmission rates supported by the second terminal. The second terminal may be RE.

According to the fifth aspect of the embodiments of this application, the second device switches to the first fiber transmission rate based on the same switching direction as that of the first device, and the duration of the first fiber transmission rate is greater than or equal to the sum of the sum of duration of all fiber transmission rates before the fiber transmission rate is switched to the first fiber transmission rate and the preset negotiation time, so that a probability of fiber transmission rate negotiation success can be increased, to ensure that the second device completes fiber transmission rate negotiation within the rotation period of the second fiber transmission rate set. Devices in a topology can perform fiber transmission rate negotiation in parallel, to effectively shorten rate negotiation duration.

In a possible implementation, in the preset switching direction, switching is performed from an $i^{th}$ fiber transmission rate to an $(i+1)^{th}$ fiber transmission rate within the rotation period of the second fiber transmission rate set, or from an $(i+1)^{th}$ fiber transmission rate to an $i^{th}$ fiber transmission rate within the rotation period of the second fiber transmission rate set, where i is an integer greater than or equal to 1. If in the preset switching direction used by the first device, switching is performed from the $i^{th}$ fiber transmission rate to the $(i+1)^{th}$ fiber transmission rate, in the preset switching direction used by the second device, switching is also performed from the $i^{th}$ fiber transmission rate to the $(i+1)^{th}$ fiber transmission rate, in other words, switching is performed from a fiber transmission rate with a smaller number to a fiber transmission rate with a larger number, to ensure that rate negotiation can be completed in a rotation period.

In a possible implementation, the second device switches a fiber transmission rate of a second port of the second device to a second fiber transmission rate based on the preset switching direction within the rotation period of the second fiber transmission rate set, and sends a negotiation packet to a third device adjacent to the second device through the second port of the second device within duration of the second fiber transmission rate. The duration of the second fiber transmission rate is greater than or equal to a sum of a sum of duration of all fiber transmission rates before the fiber transmission rate is switched to the second fiber transmission rate and the preset negotiation time. If a response packet is received from the third device through the second port of the second device within the duration of the second fiber transmission rate, the second device controls the second port of the second device to communicate with the third device based on the second fiber transmission rate. A same RE can perform rate negotiation with a plurality of adjacent REs in parallel, to effectively shorten rate negotiation duration.

In a possible implementation, the second fiber transmission rate is the same as the first fiber transmission rate. The same RE and the plurality of adjacent REs may use a same fiber transmission rate, so that a REC may conveniently and simply manage the REs.

In a possible implementation, the second fiber transmission rate is different from the first fiber transmission rate. The same RE and the plurality of adjacent REs may use different fiber transmission rates, and it is relatively complex for a REC to summarize end bandwidths, and is inconvenient for the REC to manage each RE. However, bandwidth utilization can be improved.

In a possible implementation, the second device receives a reference fiber transmission rate from the first device, and stores the reference fiber transmission rate. In this way, when the second device starts after the system is reset, the reference fiber transmission rate is kept for a period of time, and the second device performs rate negotiation with the REC.

In a possible implementation, the second device starts, at the reference fiber transmission rate, and sends a negotiation packet to the first device through the first port of the second device within duration of the reference fiber transmission rate.

If a response packet is received from the first device through the first port of the second device within the duration of the reference fiber transmission rate, the second device controls the first port of the second device to communicate with the first device based on an initial transmission rate.

If a response packet is not received from the first device through the first port of the second device within the duration of the reference fiber transmission rate, the second device performs a step of switching the fiber transmission rate of the first port of the second device to the first fiber transmission rate based on the preset switching direction within the rotation period of the second fiber transmission rate set.

A sixth aspect of the embodiments of this application provides a second device, and the second device has a function of implementing the method provided in the fifth aspect. The function may be implemented by hardware, or may be implemented by hardware executing corresponding software. The hardware or software includes one or more modules corresponding to the function.

In a possible implementation, the second device includes a processing unit and a transceiver unit. The processing unit is configured to switch a fiber transmission rate of a first port of the second device to a first fiber transmission rate based on a preset switching direction within a rotation period of a second fiber transmission rate set. The second fiber transmission rate set is a fiber transmission rate set of the second device, and the second fiber transmission rate set includes the first fiber transmission rate. The processing unit is further configured to: within duration of the first fiber transmission rate, if the transceiver unit receives a negotiation packet from a first device adjacent to the second device through the first port of the second device, and the processing unit successfully decodes the negotiation packet, control the first port of the second device to communicate with the first device based on the first fiber transmission rate. The duration of the first fiber transmission rate is greater than or equal to a sum of a sum of duration of all fiber transmission rates before the fiber transmission rate is switched to the first fiber transmission rate and a preset negotiation time. The transceiver unit is further configured to send a response packet to the first device through the first port of the second device.

In a possible implementation, the second device includes a processor, a transceiver, and a memory. The memory stores a computer program, the computer program includes program instructions, and the processor is configured to invoke program code to perform the following operations: switching a fiber transmission rate of a first port of the second device to a first fiber transmission rate based on a preset switching direction within a rotation period of a second fiber transmission rate set, where the second fiber transmission rate set is a fiber transmission rate set of the second device, and the second fiber transmission rate set includes the first fiber transmission rate; within duration of the first fiber transmission rate, if the transceiver receives a negotiation packet from a first device adjacent to the second device through the first port of the second device, and the processor successfully decodes the negotiation packet, controlling the first port of the second device to communicate with the first device based on the first fiber transmission rate, where duration of the first fiber transmission rate is greater than or equal to a sum of a sum of duration of all fiber transmission rates before the fiber transmission rate is switched to the first fiber transmission rate and a preset negotiation time; and controlling the transceiver to send a response packet to the first device through the first port of the second device.

Based on a same concept, for a problem-resolving principle and beneficial effects of the second device, refer to the method and beneficial effects brought by the method in the fifth aspect. Therefore, for implementation of the apparatus, refer to the implementation of the method. Repeated parts are not described again.

A seventh aspect of the embodiments of this application provides a computer-readable storage medium. The computer-readable storage medium stores instructions. When the instructions are run on a computer, the computer is enabled to perform the method according to the fifth aspect.

An eighth aspect of the embodiments of this application provides a computer program product including instructions. When the computer program product runs on a computer, the computer is enabled to perform the method according to the fifth aspect.

A ninth aspect of the embodiments of this application further provides a rate negotiation system, including the first device provided in the second aspect and the second device provided in the sixth aspect.

BRIEF DESCRIPTION OF DRAWINGS

To describe technical solutions in embodiments of this application or in the background more clearly, the following describes the accompanying drawings for describing the embodiments of this application or the background.

DESCRIPTION OF EMBODIMENTS

The following describes technical solutions in embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of the items, including any combination of one item (piece) or a plurality of items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not constitute a limitation on a quantity or an execution sequence, and that the terms such as "first" and "second" do not indicate a definite difference.

In addition network architecture and a scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new scenario, the technical solutions provided in the embodiments of this application are also applicable to a similar technical problem.

Figure 1:
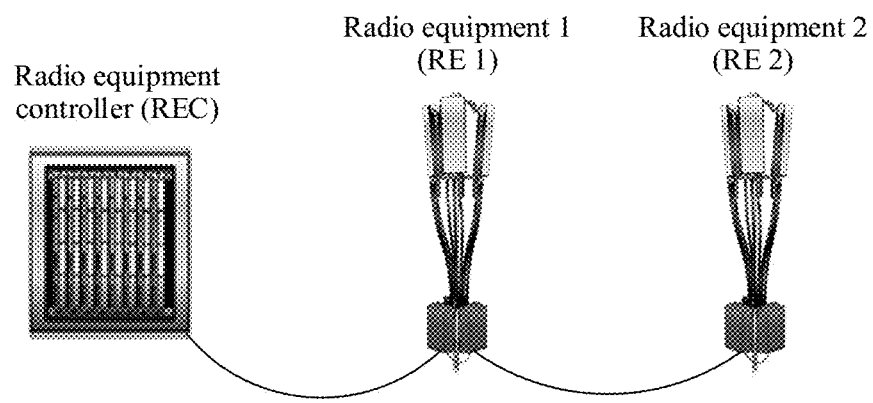
FIG. 1 is a schematic diagram of a network architecture to which an embodiment of this disclosure is applied.

FIG. 1 is a schematic diagram of a network architecture to which an embodiment of this application is applied. The schematic diagram of the network architecture shown in FIG. 1 includes a REC, RE 1, and RE 2. It should be noted that device forms of the REC and the REs shown in FIG. 1 do not constitute a limitation on the embodiments of this application. In FIG. 1, two REs are used as an example. During actual application, a quantity of REs is not limited to 2. A network topology formed by the REC and the RE in FIG. 1 is a chain topology, and during actual applications, the network topology formed by the REC and the RE may alternatively be a ring topology, a load sharing topology, a star topology, a tree topology, or the like.

The REC may correspond to a building baseband unit (BBU) in a base station. The building baseband unit is configured to implement a baseband processing function (coding, multiplexing, modulation, spreading, or the like) of a Uu interface, an Iub interface function of a radio network controller (RNC), signaling processing, local and remote operation and maintenance functions, and work status monitoring and alarm information reporting functions of a base station system.

The RE may correspond to a radio remote unit (RRU) in the base station. The RRU may be divided into four large modules: an intermediate frequency module, a transceiver module, a power amplification module, and a filter module. The digital intermediate frequency module is configured to perform modulation and demodulation in optical transmission, digital up-conversion and down-conversion, and analog/digital (A/D) conversion, and so on. The transceiver module completes conversion from an intermediate frequency signal to a radio frequency signal. Then, the power amplification module and the filter module transmit the radio frequency signal through an antenna port.

The base station may be a base station in a conventional communications system, for example, a NodeB in a $3^{rd}$-generation (3G) mobile communications system or an evolved NodeB (evolution NodeB, eNB or e-NodeB) in a long term evolution (LTE) system, or may be a gNB in a $5^{th}$-generation (5G) mobile communications system; or may be a base station in a future communications system.

The CPRI standard defines an interface relationship between the REC and the RE in the conventional communications system. The enhanced common public radio interface (eCPRI) standard defines a specification for connecting an enhanced radio equipment controller (eREC) and enhanced radio equipment (eRE) through a fronthaul transport network. The eCPRI is used in the 5G system.

It should be noted that the REC in the embodiments of this application may be a radio equipment controller in the conventional communications system, or may be an enhanced radio equipment controller in the 5G system, or may be a radio equipment controller in the future communications system. The RE in the embodiments of this application is similar to the REC. In the embodiments of this application, the interface relationship between the REC and the RE may be defined by the CPRI standard, or may be defined by the eCPRI standard, or may be defined by a future common public radio interface standard.

The embodiments of this application may be used in the conventional communications system, or may be used in the 5G communications system, or even may be used in the future communications system.

Figure 2:
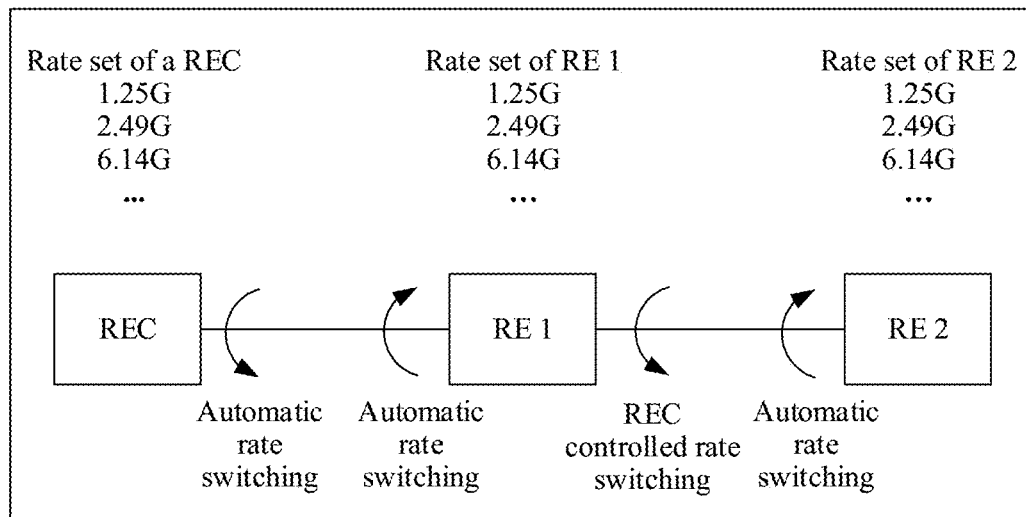
FIG. 2 is a schematic diagram of reverse rate rotation.

In a current automatic rate negotiation method, during an initial negotiation, for details, refer to a schematic diagram of reverse rate rotation shown in FIG. 2. The REC switches from a low fiber transmission rate to a high fiber transmission rate based on a rate capability of the REC, and each fiber transmission rate is kept for 4 s. The RE 1 switches from a high fiber transmission rate to a low fiber transmission rate, and each fiber transmission rate is kept for 1 s. In this way, the REC and the RE 1 perform reverse rate rotation. In addition, because the rates are kept for different time, theoretically, the REC and the RE 1 may experience a same fiber transmission rate. In addition, for a rate negotiation between the two REs, upper-level RE and lower-level RE need to be distinguished from each other. In FIG. 2, the RE 1 is upper-level RE of the RE 2, and the RE 2 is lower-level RE of the RE 1. For the lower-level RE, the upper-level RE is also based on rate rotation similar to that between the REC and the RE. For example, in FIG. 2, the RE 1 switches from a low fiber transmission rate to a high fiber transmission rate, and each fiber transmission rate is kept for 4 s. The RE 2 switches from a high fiber transmission rate to a low fiber transmission rate, and each fiber transmission rate is kept for 1 s, so that the upper-level RE and the lower-level RE can negotiate a consistent rate. An identity of the upper-level RE is obtained after the upper-level RE is connected to the REC. In this method, identities of the REC and the RE need to be determined, and whether the RE is upper-level RE or lower-level RE needs to be distinguished. Therefore, a rate negotiation for an entire link is performed in sequence, and an entire rate negotiation takes a relatively long time. In addition, the method is applicable to a chain topology. For a non-chain topology, a rate negotiation failure may be caused because differential identities between REs cannot be obtained.

In view of this, embodiments of this application provide a rate negotiation method and an apparatus thereof, so that devices in a topology can perform fiber transmission rate negotiation in parallel, to effectively shorten rate negotiation duration. In addition, in the embodiments of this application, regardless of a location of a device in a network and any network topology that is used, the rate negotiation method provided in the embodiments of this application can be used, so that system complexity can be reduced, and system reliability and network adaptability can be improved.

The rate negotiation method provided in the embodiments of this application is applicable to various network topologies, and a chain topology is mainly used as an example for description.

Terms or names used in the embodiments of this application are explained below.

A fiber transmission rate refers to a transmission rate that is of a physical layer on a REC side or an RE side and that is on a fiber.

The following describes in detail the rate negotiation method provided in the embodiments of this application.

Figure 3:
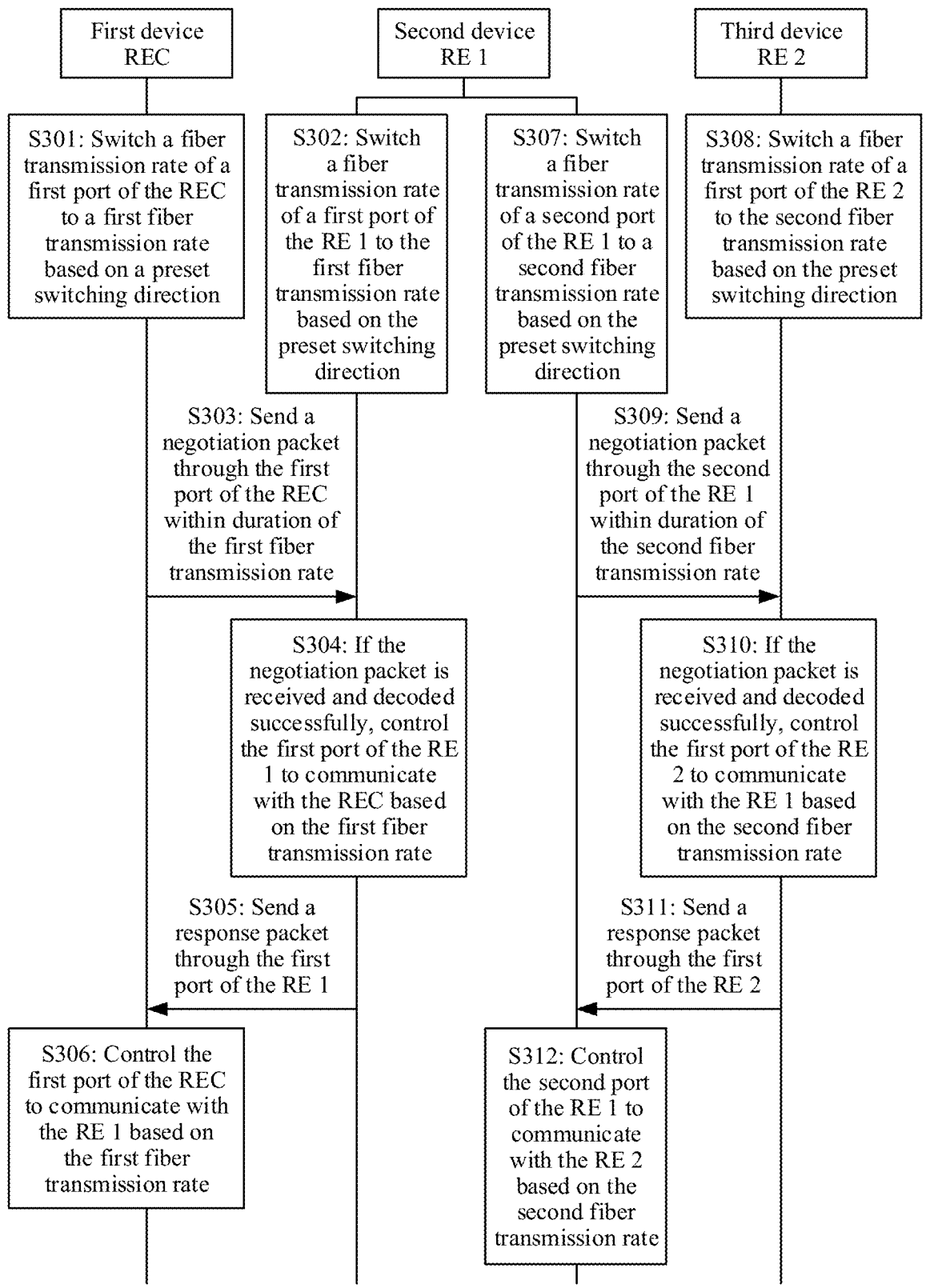
FIG. 3 is a schematic flowchart of a rate negotiation method according to an embodiment of this disclosure.

In an example, the embodiments of this application are applied to the network architecture shown in FIG. 1. FIG. 3 is a schematic flowchart of a rate negotiation method according to an embodiment of this application. In the embodiment shown in FIG. 3, a first device is a REC, a second device is RE 1, and a third device is RE 2. The REC, the RE 1 and the RE 2 form a chain topology.

The embodiment shown in FIG. 3 may include but is not limited to the following steps.

Step S301: The first device REC switches a fiber transmission rate of a first port of the first device REC to a first fiber transmission rate based on a preset switching direction within a rotation period of a first fiber transmission rate set.

The first fiber transmission rate set is a set of fiber transmission rates supported by the first device REC, and includes the first fiber transmission rate. The first fiber transmission rate may be any one of the fiber transmission rates in the first fiber transmission rate set. The fiber transmission rates in the first fiber transmission rate set may be arranged in ascending order, may be arranged in descending order, or may be arranged in any order. The rotation period of the first fiber transmission rate set refers to a sum of time spent when each fiber transmission rate in the first fiber transmission rate set is experienced once, for example, a sum of time spent from a time when a $1^{st}$ fiber transmission rate in the first fiber transmission rate set starts to be experienced to a time when a last fiber transmission rate is experienced. The fiber transmission rates within the rotation period of the fiber transmission rate set may be arranged in ascending or descending order of fiber transmission rate values, or may be arranged in any order.

The preset switching direction is related to an arrangement order of the fiber transmission rates within the rotation period of the first fiber transmission rate set. In the preset switching direction, switching is performed from an $i^{th}$ fiber transmission rate to an $(i+1)^{th}$ fiber transmission rate within the rotation period, or from an $(i+1)^{th}$ fiber transmission rate to an $i^{th}$ fiber transmission rate within the rotation period, where i is an integer greater than or equal to 1. It is assumed that the fiber transmission rates within the rotation period of the first fiber transmission rate set are arranged in ascending order of the rate values. In the preset switching direction, switching is performed from a low fiber transmission rate to a high fiber transmission rate, or from a high fiber transmission rate to a low fiber transmission rate. If there is no specific arrangement order of the fiber transmission rates in the first fiber transmission rate set within the rotation period, the fiber transmission rates within the rotation period may be numbered. In the preset switching direction, switching may be performed from a fiber transmission rate with a smaller number to a fiber transmission rate with a larger number, or from a fiber transmission rate with a larger number to a fiber transmission rate with a smaller number.

In this embodiment of this application, an example in which the preset switching direction is a direction of switching from the low fiber transmission rate to the high fiber transmission rate is used for description.

Duration of the fiber transmission rates in the first fiber transmission rate set may form a geometric progression, for example, as shown in Table 1.

TABLE 1

| Rate number | Fiber transmission rate | Duration ($2^n*T$) |
|---|---|---|
| 0 | 10 G | 1 T, n = 0 |
| 1 | 25 G | 2 T, n = 1 |
| 2 | 40 G | 4 T, n = 2 |
| 3 | 100 G | 8 T, n = 3 |
| ... | ... | ... |

It should be noted that a specific value of the fiber transmission rate in Table 1 is used as an example, and does not constitute a limitation on this embodiment of this application. In Table 1, the fiber transmission rates are arranged in ascending order, and a common ratio of the geometric progression formed by the duration is 2. If the fiber transmission rates are arranged in descending order, a common ratio of the geometric progression formed by the duration is ½. The duration may alternatively be referred to as a dwell time, a hold time, or the like.

T in Table 1 is a time unit, and is related to a physical layer technology. If fiber transmission rates between adjacent devices are the same, it is required in design that synchronization can be completed within 0.5T. On the Ethernet, synchronization can be completed within 0.5 s currently. Therefore, T may be set to 1 s.

According to Table 1, in the preset switching direction, switching is performed from a low fiber transmission rate to a high fiber transmission rate, for example, from 25G to 40G. If the fiber transmission rates within the rotation period of the fiber transmission rate set are not arranged in ascending or descending order of the fiber transmission rate values, refer to Table 2 below.

TABLE 2

| Rate number | Fiber transmission rate | Duration (2^n*T) |
|---|---|---|
| 0 | 25 G | 1 T, n = 0 |
| 1 | 10 G | 2 T, n = 1 |
| 2 | 100 G | 4 T, n = 2 |
| 3 | 40 G | 8 T, n = 3 |
| ... | ... | ... |

It can be learned from Table 1 and Table 2 that the duration of the fiber transmission rates is related to the rate numbers of the fiber transmission rates, and the preset switching direction is also related to the rate numbers. In other words, the duration of the fiber transmission rates is related to locations of the fiber transmission rates within the rotation period of the fiber transmission rate set.

In Table 1 and Table 2, the duration of the fiber transmission rates forms the geometric progression, and duration of the $i^{th}$ fiber transmission rate is equal to a sum of duration of all fiber transmission rates before the $i^{th}$ fiber transmission rate plus T. For example, a 3 rd fiber transmission rate is a fiber transmission rate whose rate number is 2 and whose duration=1T+2T+T=4T. In another possible implementation, duration of the $i^{th}$ fiber transmission rate is greater than a sum of duration of all fiber transmission rates before the $i^{th}$ fiber transmission rate plus T. For example, a 3 rd fiber transmission rate is a fiber transmission rate whose rate number is 2 and whose duration is greater than 1T+2T+T, and may be 5T.

Figure 4:
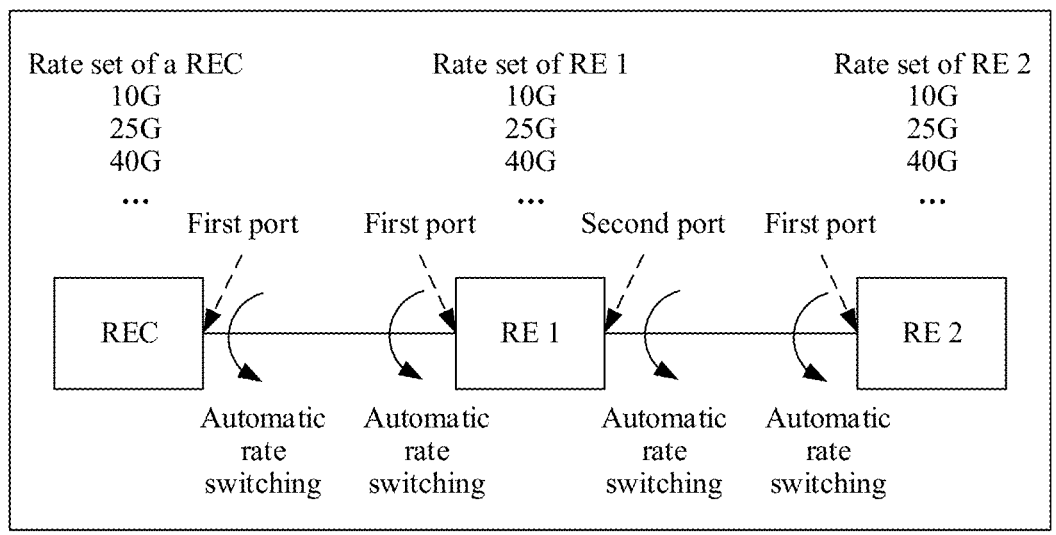
FIG. 4 is a schematic diagram of codirectional rate rotation according to an embodiment of this disclosure.

The first device REC switches the fiber transmission rate of the first port of the first device REC to the first fiber transmission rate based on the preset switching direction within the rotation period of the first fiber transmission rate set. For example, the first device REC switches the fiber transmission rate of the first port of the first device REC from 25G to 40G. When duration of a fiber transmission rate before the first fiber transmission rate reaches corresponding duration, the first device REC switches to the first fiber transmission rate. For example, the first device REC switches to 40G when duration of 25G reaches 2T. The first port of the first device REC is a port for communicating with the second device RE 1. In this embodiment of this application, it is assumed that the first port of the first device REC communicates with a first port of the second device RE 1. Refer to a schematic diagram of codirectional rate rotation shown in FIG. 4.

Step S302: The second device RE 1 switches a fiber transmission rate of the first port of the second device RE 1 to the first fiber transmission rate based on the preset switching direction within a rotation period of a second fiber transmission rate set.

The second fiber transmission rate set is a set of fiber transmission rates supported by the second device RE 1, and includes the first fiber transmission rate. The second fiber transmission rate set and the first fiber transmission rate set are partially or completely the same, which depends on a specific situation. That the second fiber transmission rate set and the first fiber transmission rate set are partially the same means that the second fiber transmission rate set and the first fiber transmission rate set have an intersection set. That the second fiber transmission rate set and the first fiber transmission rate set are completely the same means that the first device REC and the second device RE support a same quantity of fiber transmission rates and rate values are also the same. Although the fiber transmission rates included in the first fiber transmission rate set may be different from fiber transmission rates included in the second fiber transmission rate set, a same fiber transmission rate in the first fiber transmission rate set and the second fiber transmission rate set has same duration. In other words, Table 1 is applicable to any device in a topology.

Step S301 is similar to step S302. Refer to the description of step S301. The second device RE 1 and the first device REC switch rates in a same direction. Refer to the schematic diagram of codirectional rate rotation shown in FIG. 4. Both the second device RE 1 and the first device REC switch from a low fiber transmission rate to a high fiber transmission rate.

Step S303: The first device REC sends a negotiation packet to the second device RE 1 through the first port of the first device REC within the duration of the first fiber transmission rate.

In a possible implementation, the duration of the first fiber transmission rate is equal to a sum of a sum of duration of all fiber transmission rates before the fiber transmission rate is switched to the first fiber transmission rate and a preset negotiation time. The preset negotiation time is T. For example, based on Table 1, the first fiber transmission rate is 40G, and the duration of the first fiber transmission rate is 4T. A sum of duration of 10G and 25G is 3T, and 3T plus the preset negotiation time T is 4T. For another example, the first fiber transmission rate is 100G, and the duration of the first fiber transmission rate is 8T. A sum of duration of 10G, 25G, and 40G is 7T, and 7T plus the preset negotiation time T is 4T. In this embodiment of this application, the preset negotiation time T may be is or less than 1 s.

In a possible implementation, the duration of the first fiber transmission rate is greater than a sum of a sum of duration of all fiber transmission rates before the fiber transmission rate is switched to the first fiber transmission rate and a preset negotiation time. For example, the first fiber transmission rate is 40G, and the duration of the first fiber transmission rate may be 5T, which is greater than a sum of duration of 10G and 25G plus the preset negotiation time T.

For example, the first device REC sends the negotiation packet to the second device RE 1 through the first port of the first device REC within the duration 4T of 40G.

The negotiation packet includes a parity bit of the first fiber transmission rate, that is, the negotiation packet is encoded by using the parity bit. The first device REC sends the negotiation packet to another device. When the another device receives the negotiation packet, if a fiber transmission rate of the another device is the first fiber transmission rate, the another device can successfully decode the negotiation packet. If a fiber transmission rate of the another device is not the first fiber transmission rate, the another device cannot decode the negotiation packet.

Optionally, the negotiation packet may further indicate the first device REC and the first port of the first device REC, so that a device that receives and successfully decodes the negotiation packet may learn of a port of a device with which the device communicates. The first device REC may be indicated by using a device identifier, where the device identifier may be a device code, an internet protocol (internet protocol, IP) address, a media access control (media access control, MAC) address, or the like. The first port of the first device REC may be indicated by using a port identifier, and the port identifier may be a port number or the like.

Within the duration of the first fiber transmission rate, the first device REC may periodically or continuously send negotiation packets to the second device RE 1. A sending time interval is not limited in this embodiment of this application.

Step S304: Within the duration of the first fiber transmission rate, if the second device RE 1 receives the negotiation packet from the first device REC through the first port of the second device RE 1, and successfully decodes the negotiation packet, the second device RE 1 controls the first port of the second device RE 1 to communicate with the first device REC based on the first fiber transmission rate.

Within the duration of the first fiber transmission rate, if the second device RE 1 receives the negotiation packet from the first device REC through the first port of the second device RE 1, and successfully decodes the negotiation packet, it indicates that the fiber transmission rate of the first device REC is the same as the fiber transmission rate of the second device RE 1, and both are the first fiber transmission rate in this embodiment of this application. In this case, the second device RE 1 controls the first port of the second device RE 1 to communicate with the first device REC based on the first fiber transmission rate. The first port of the second device RE 1 is a port through which the second device RE 1 receives the negotiation packet.

If the second device RE 1 learns of the first port of the first device REC, the second device RE 1 controls the first port of the second device RE 1 to communicate with the first port of the first device REC based on the first fiber transmission rate.

Step S305: The second device RE 1 sends a response packet to the first device REC.

After successfully decoding the negotiation packet, the second device RE 1 may send the response packet to the first device REC, and send the response packet to the first device REC through the first port of the second device RE 1. The response packet is used to respond to the negotiation packet, and may be used to indicate negotiation success.

Optionally, the response packet may further indicate the second device RE 1 and the first port of the second device RE 1, so that the first device REC may learn of a port of a device with which the first device REC communicates.

The second device RE 1 may send the response packet and control the first port of the second device RE 1 to communicate with the first port of the first device REC based on the first fiber transmission rate at the same time.

Step S306: The first device REC controls the first port of the first device REC to communicate with the second device RE 1 based on the first fiber transmission rate.

If the first device REC receives the response packet from the second device RE 1 through the first port of the first device REC within the duration of the first fiber transmission rate, the first device REC may control the first port of the first device REC to communicate with the first port of the second device RE 1 based on the first fiber transmission rate.

If a negotiation between the first device REC and the second device RE 1 succeeds, the first device REC and the second device RE 1 may transmit data based on the first fiber transmission rate.

The foregoing step S301 to step S306 are a process in which the first device REC and the second device RE 1 perform fiber transmission rate negotiation. During actual application, there may be more than one second device adjacent to the first device REC. For each second device, fiber transmission rate negotiation may be performed according to step S301 to step S306. For example, in a network topology such as a star topology, a tree topology, or a ring topology, the REC may be connected to two or more REs, and each RE may separately perform fiber transmission rate negotiation with the REC. A fiber transmission rate negotiated between each RE and the REC may be the same or different, which depends on a specific situation. If the fiber transmission rate negotiated between each RE and the REC is the same, the REC can conveniently and simply manage RE adjacent to the REC.

Step S307: The second device RE 1 switches a fiber transmission rate of a second port of the second device RE 1 to the second fiber transmission rate based on the preset switching direction within the rotation period of the second fiber transmission rate set.

Step S308: The third device RE 2 switches a fiber transmission rate of a first port of the third device RE 2 to the second fiber transmission rate based on the preset switching direction within a rotation period of a third fiber transmission rate set.

Step S309: The second device RE 1 sends a negotiation packet to the third device RE 2 through the second port of the second device RE 1 within duration of the second fiber transmission rate.

Step S310: Within the duration of the second fiber transmission rate, if the third device RE 2 receives the negotiation packet from the second device RE 1 through the first port of the third device RE 2, and successfully decodes the negotiation packet, the third device RE 2 controls the first port of the third device RE 2 to communicate with the second device RE 1 based on the first fiber transmission rate.

Step S311: The third device RE 2 sends a response packet to the second device RE 1.

Step S312: The second device RE 1 controls the second port of the second device RE 1 to communicate with the third device RE 2 based on the second fiber transmission rate.

The foregoing step S307 to step S312 are a process in which the second device RE 1 and the third device RE 2 perform fiber transmission rate negotiation, and is similar to the process in which the first device REC and the second device RE 1 perform fiber transmission rate negotiation. Details are not described herein again.

The second fiber transmission rate for communication between the second device RE 1 and the third device RE 2 may be the same as or different from the first fiber transmission rate for communication between the second device RE 1 and the first device REC, which depends on a specific situation. If the second fiber transmission rate is the same as the first fiber transmission rate, fiber transmission rates of all devices are the same in the chain topology. In this case, the REC can conveniently and simply manage REs. If the second fiber transmission rate is different from the first fiber transmission rate, it is relatively complex for the REC to summarize end bandwidths, and is inconvenient for the REC to manage the REs. However, bandwidth utilization can be improved.

It should be noted that step S301 to step S306 and step S307 to step S312 may be performed at the same time. For example, the devices in the topology may perform fiber transmission rate negotiation in parallel, to effectively shorten rate negotiation duration.

In the embodiment shown in FIG. 3, the devices in the chain topology switch fiber transmission rates based on a same direction, and perform fiber transmission rate negotiation with adjacent devices. The devices may perform fiber transmission rate negotiation in parallel, to effectively shorten rate negotiation duration.

For any device in any network topology, the device and an adjacent device may switch fiber transmission rates based on a same direction, and perform fiber transmission rate negotiation, so that system complexity is reduced, and system reliability and network adaptability are improved.

In a possible implementation, the first device REC obtains rate capability information of the second device RE 1, where the rate capability information is used to indicate a set of fiber transmission rates supported by the second device RE 1. The first device REC may send a query message to the second device RE 1, the second device RE 1 extracts the rate capability information of the second device RE 1 when receiving the query message, and sends a feedback message to the first device REC. The feedback message includes the rate capability information of the second device RE 1.

The first device REC determines a reference fiber transmission rate between the first device REC and the second device RE 1 based on the rate capability information of the second device RE 1. The first device REC may set the reference fiber transmission rate between the first device REC and the second device RE 1 based on a requirement of the first device REC and the second device RE 1. The requirement may include a bandwidth requirement, a delay requirement, and the like. The reference fiber transmission rate is included in the first fiber transmission rate set, and is also included in the second fiber transmission rate set. It should be noted that the reference fiber transmission rate may be the $1^{st}$ fiber transmission rate in Table 1, or may be any fiber transmission rate in Table 1, which depends on a specific situation.

Then, the first device REC sends the reference fiber transmission rate to the second device RE 1. When receiving the reference fiber transmission rate, the second device RE 1 stores the reference fiber transmission rate. When the second device RE 1 starts next time, the second device RE 1 starts at the reference fiber transmission rate, and sends a negotiation packet to the first device REC through the first port of the second device RE 1 within duration of the reference fiber transmission rate. The first device RE 1 may obtain the duration of the reference fiber transmission rate by looking up Table 1. It may be understood that the reference fiber transmission rate is a preferred fiber transmission rate set by the first device REC for the second device RE 1. In this way, when the second device RE 1 restarts after the system is reset, a time required for performing rate negotiation again according to step S301 to step S306 can be reduced.

Within the duration of the reference fiber transmission rate, if the first device REC receives the negotiation packet from the second device RE 1 through the first port of the first device REC, and successfully decodes the negotiation packet, the first device REC controls the first port of the first device REC to communicate with the second device RE 1 according to the reference fiber transmission rate, and it indicates that the negotiation succeeds. In this case, the first device REC may send a response packet to the second device RE 1, and the second device RE 1 receives the response packet and controls the first port of the second device RE 1 to communicate with the first device RE 1 based on an initial transmission rate. If the second device RE 1 does not receive the response packet, after the duration of the reference fiber transmission rate reaches corresponding duration, the second device RE 1 switches to a next fiber transmission rate, that is, the second device RE 1 performs rate negotiation with the first device REC again, and step S302 to step S306 may be performed again.

Within the duration of the reference fiber transmission rate, if the first device fails to receive the negotiation packet from the second device through the first port of the first device or fails to decode the negotiation packet, it indicates that the negotiation fails. In this case, the first device REC performs rate negotiation with the second device RE 1 again, and step S301 to step S306 may be performed again.

Further, the first device REC may obtain rate capability information of each RE in the topology other than the first device REC, set a reference fiber transmission rate for each RE, and send the corresponding reference fiber transmission rate to each RE. The reference fiber transmission rate set by the REC for each RE may be the same or different. Each RE stores the reference fiber transmission rate after receiving the reference fiber transmission rate. When each RE restarts after the system is reset next time, the reference fiber transmission rate is first kept for a period of time. If the RE fails to negotiate a fiber transmission rate with a peer device in the period of time, rate negotiation may be performed again according to step S301 to step S306 or step S307 to step S312.

It may be understood that, if the REC sets the reference fiber transmission rate for each RE in the topology, when each device restarts after the system is reset, a time required for rate negotiation can be reduced. When the REC sets the reference fiber transmission rate for each RE in the topology, the network topology may not be limited, so that the application scope of this embodiment of this application is wider.

The following proves that adjacent devices can perform fiber transmission rate negotiation through codirectional rate rotation within one complete rotation period.

Figure 5:
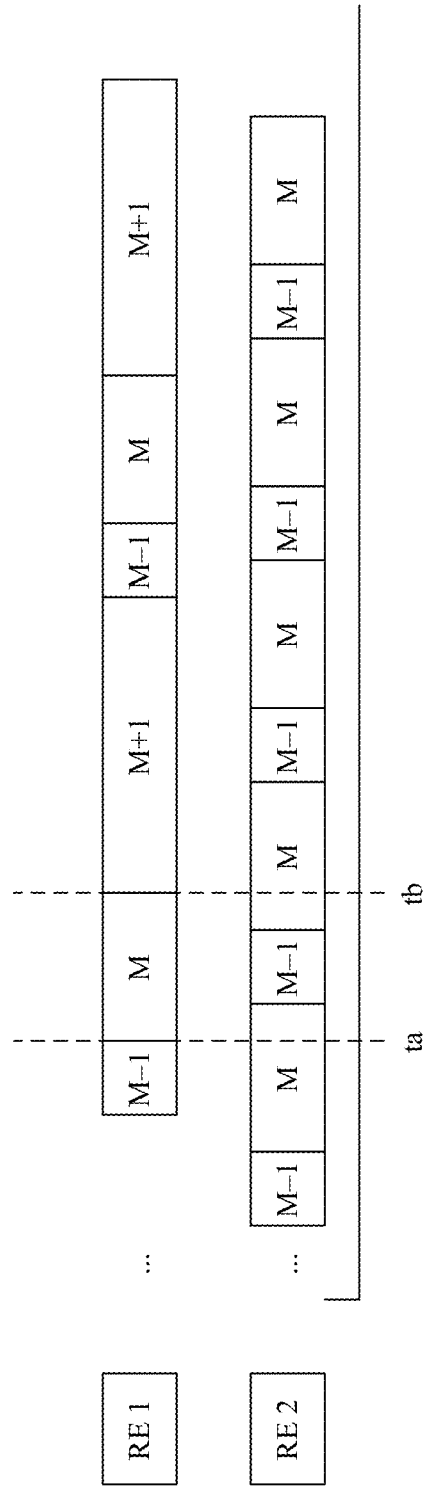
FIG. 5 is a schematic diagram of a process in which two adjacent devices perform fiber transmission rate matching.

It is assumed that the RE 1 supports N types of fiber transmission rates, and the RE 2 supports M types of fiber transmission rates, where N≥M. An $M^{th}$ type of fiber transmission rate is used as a target fiber transmission rate. Refer to a schematic diagram of a process in which two adjacent devices perform fiber transmission rate matching shown in FIG. 5. An initial fiber transmission rate and a start moment of each of the RE 1 and the RE 2 can be specified randomly. In FIG. 5, it is assumed that M=2, and N=3. A block in which M is located indicates duration of the $M^{th}$ type of fiber transmission rate, namely, 2T. A block in which M−1 is located indicates duration of an $(M-1)^{th}$ type of fiber transmission rate, namely, 1T. A block in which M+1 is located indicates duration of an $(M+1)^{th}$ type of fiber transmission rate, namely, 4T. For the RE 1, one complete rotation period includes the block in which M−1 is located plus the block in which M is located plus the block in which (M+1) is located, or includes the block in which M is located plus the block in which (M+1) is located plus the block in which (M−1) is located. For the RE 2, one complete rotation period includes the block in which M−1 is located plus the block in which M is located.

For any block, of the RE 1, in which M is located, a time period to which the block belongs is [ta, tb], and a duration range of a corresponding block in which M−1 is located is [0, 1]*2^M*T. In other words, there are a minimum of zero blocks in which M−1 is located and a maximum of one block in which M−1 is located. In the time period [ta, tb], when the block in which M−1 is located is 1T, in the RE 2, minimum duration of a block in which M is located is 1T (which can be obtained from a property of a geometric progression). Because minimum duration of the block in which M is located, 1T, may be split by the block in which M−1 is located, and minimum duration of a large block obtained after the split is 0.5T, provided that a length of T is set to satisfy minimum duration of a rate negotiation, it can be ensured that the $M^{th}$ type of fiber transmission rate is successfully negotiated. In the Ethernet, the minimum duration of the rate negotiation is 0.5 s. Therefore, when T is set to 1 s, it can be ensured that the $M^{th}$ type of fiber transmission rate is successfully negotiated.

The foregoing proof process is for a case in which N≥M, and a case in which M≥N may be similarly proved. In other words, regardless of fiber transmission rate sets of two adjacent devices, provided that there is an intersection set between the fiber transmission rate sets of the two devices, the rate negotiation can be completed within one complete rate rotation period.

In the foregoing proof process, the duration of the fiber transmission rates in the fiber transmission rate set forms the geometric progression. When a fiber transmission rate is greater than a sum of duration of all fiber transmission rates before the fiber transmission rate plus the preset negotiation time, it can also be proved that the adjacent devices can perform fiber transmission rate negotiation through codirectional rate rotation within one complete rotation period.

The foregoing describes in detail the method in the embodiments of this application. The following provides apparatuses in the embodiments of this application.

Figure 6:
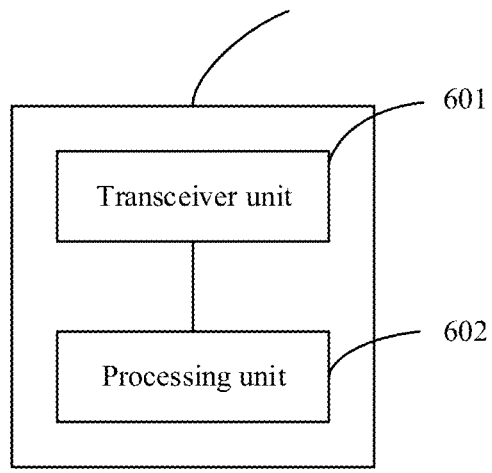
FIG. 6 is a schematic diagram of a logical structure of a rate negotiation apparatus according to an embodiment of this disclosure.

FIG. 6 is a schematic diagram of a logical structure of a rate negotiation apparatus according to an embodiment of this application. A rate negotiation apparatus 60 may include a transceiver unit 601 and a processing unit 602. The rate negotiation apparatus 60 may be a first device REC, or may be a second device RE.

If the rate negotiation apparatus 60 is the first device REC, the processing unit 602 is configured to switch a fiber transmission rate of a first port of the first device to a first fiber transmission rate based on a preset switching direction within a rotation period of a first fiber transmission rate set. The first fiber transmission rate set is a fiber transmission rate set of the first device, and the first fiber transmission rate set includes the first fiber transmission rate.

The transceiver unit 601 is configured to send a negotiation packet to a second device adjacent to the first device through the first port of the first device within duration of the first fiber transmission rate. The duration of the first fiber transmission rate is greater than or equal to a sum of a sum of duration of all fiber transmission rates before the fiber transmission rate is switched to the first fiber transmission rate and a preset negotiation time.

The processing unit 602 is further configured to: if the transceiver unit 601 receives a response packet from the second device through the first port of the first device within the duration of the first fiber transmission rate, control the first port of the first device to communicate with the second device based on the first fiber transmission rate.

In a possible implementation, in the preset switching direction, switching is performed from an $i^{th}$ fiber transmission rate to an $(i+1)^{th}$ fiber transmission rate within the rotation period of the first fiber transmission rate set, or from an $(i+1)^{th}$ fiber transmission rate to an $i^{th}$ fiber transmission rate within the rotation period of the first fiber transmission rate set, where i is an integer greater than or equal to 1.

In a possible implementation, the processing unit 602 is further configured to switch a fiber transmission rate of a second port of the first device to a second fiber transmission rate based on the preset switching direction within the rotation period of the first fiber transmission rate set, where the first fiber transmission rate set includes the second fiber transmission rate.

The transceiver unit 601 is further configured to send a negotiation packet to a third device adjacent to the first device through the second port of the first device within duration of the second fiber transmission rate, where the duration of the second fiber transmission rate is greater than or equal to a sum of a sum of duration of all fiber transmission rates before the fiber transmission rate is switched to the second fiber transmission rate and the preset negotiation time.

The processing unit 602 is further configured to: if the transceiver unit 601 receives a response packet from the third device through the second port of the first device within the duration of the second fiber transmission rate, control the second port of the first device to communicate with the third device based on the second fiber transmission rate.

In a possible implementation, the second fiber transmission rate is the same as the first fiber transmission rate.

In a possible implementation, the second fiber transmission rate is different from the first fiber transmission rate.

In a possible implementation, the processing unit 602 is further configured to: within duration of a third fiber transmission rate, if the transceiver unit 601 receives a negotiation packet from a fourth device adjacent to the first device through a third port of the first device, and the processing unit 602 successfully decodes the negotiation packet, control the third port of the first device to communicate with the fourth device based on the third fiber transmission rate. The duration of the third fiber transmission rate is greater than or equal to a sum of a sum of duration of all fiber transmission rates before the fiber transmission rate is switched to the third fiber transmission rate and the preset negotiation time. The first fiber transmission rate set includes the third fiber transmission rate.

The transceiver unit 601 is further configured to send a response packet to the fourth device through the third port of the first device.

In a possible implementation, the processing unit 602 is further configured to: obtain a second fiber transmission rate set, where the second fiber transmission rate set is a fiber transmission rate set of the second device; and determine a reference fiber transmission rate between the first device and the second device based on the second fiber transmission rate set.

The transceiver unit 601 is further configured to send the reference fiber transmission rate to the second device.

In a possible implementation, the processing unit 602 is further configured to: within duration of the reference fiber transmission rate, if the transceiver unit 601 receives a negotiation packet from the second device through the first port of the first device, and the processing unit 602 successfully decodes the negotiation packet, control the first port of the first device to communicate with the second device based on the reference fiber transmission rate.

The processing unit 602 is further configured to: within the duration of the reference fiber transmission rate, if the transceiver unit 601 does not receive a negotiation packet from the second device through the first port of the first device, or the processing unit 602 fails to decode the negotiation packet, perform, based on the first fiber transmission rate set, a step of switching the fiber transmission rate of the first port of the first device to the first fiber transmission rate based on the preset switching direction.

If the rate negotiation apparatus 60 is the first device REC, a function of the REC in the embodiment shown in FIG. 3 may be implemented. For a detailed process performed by the units in the rate negotiation apparatus 60, refer to the steps performed by the REC in the embodiment shown in FIG. 3. Details are not described herein again.

If the rate negotiation apparatus 60 is the second device RE,

The processing unit 602 is configured to switch a fiber transmission rate of a first port of the second device to a first fiber transmission rate based on a preset switching direction within a rotation period of a second fiber transmission rate set. The second fiber transmission rate set is a fiber transmission rate set of the second device, and the second fiber transmission rate set includes the first fiber transmission rate.

The processing unit 602 is configured to: within duration of the first fiber transmission rate, if the transceiver unit 601 receives a negotiation packet from a first device adjacent to the second device through the first port of the second device, and the processing unit 602 successfully decodes the negotiation packet, control the first port of the second device to communicate with the first device based on the first fiber transmission rate. The duration of the first fiber transmission rate is greater than or equal to a sum of a sum of duration of all fiber transmission rates before the fiber transmission rate is switched to the first fiber transmission rate and a preset negotiation time.

The transceiver unit 601 is further configured to send a response packet to the first device through the first port of the second device.

In a possible implementation, in the preset switching direction, switching is performed from an $i^{th}$ fiber transmission rate to an $(i+1)^{th}$ fiber transmission rate within the rotation period of the second fiber transmission rate set, or from an $(i+1)^{th}$ fiber transmission rate to an $i^{th}$ fiber transmission rate within the rotation period of the second fiber transmission rate set, where i is an integer greater than or equal to 1.

In a possible implementation, the processing unit 602 is further configured to switch a fiber transmission rate of a second port of the second device to a second fiber transmission rate based on the preset switching direction within the rotation period of the second fiber transmission rate set.

The transceiver unit 601 is further configured to send a negotiation packet to a third device adjacent to the second device through the second port of the second device within duration of the second fiber transmission rate. The duration of the second fiber transmission rate is greater than or equal to a sum of a sum of duration of all fiber transmission rates before the fiber transmission rate is switched to the second fiber transmission rate and the preset negotiation time.

The processing unit 602 is further configured to: if the transceiver unit 601 receives a response packet from the third device through the second port of the second device within the duration of the second fiber transmission rate, control the second port of the second device to communicate with the third device based on the second fiber transmission rate.

In a possible implementation, the second fiber transmission rate is the same as the first fiber transmission rate.

In a possible implementation, the second fiber transmission rate is different from the first fiber transmission rate.

In a possible implementation, the rate negotiation apparatus 60 further includes a storage unit 603.

The transceiver unit 601 is further configured to receive a reference fiber transmission rate from a first device.

The storage unit 603 is configured to store the reference fiber transmission rate.

In a possible implementation, the processing unit 602 is further configured to start at the reference fiber transmission rate. The transceiver unit 601 is further configured to send a negotiation packet to the first device through the first port of the second device within duration of the reference fiber transmission rate.

The processing unit 602 is further configured to: if the transceiver unit 601 receives a response packet from the first device through the first port of the second device within the duration of the reference fiber transmission rate, control the first port of the second device to communicate with the first device based on the initial transmission rate.

The processing unit 602 is further configured to: if the transceiver unit 601 does not receive a response packet from the first device through the first port of the second device within the duration of the reference fiber transmission rate, perform a step of switching the fiber transmission rate of the first port of the second device to the first fiber transmission rate based on the preset switching direction within the rotation period of the second fiber transmission rate set.

If the rate negotiation apparatus 60 is the second device RE, a function of the RE in the embodiment shown in FIG. 3 may be implemented. For a detailed process performed by the units in the rate negotiation apparatus 60, refer to the steps performed by the RE in the embodiment shown in FIG. 3. Details are not described herein again.

Figure 7:
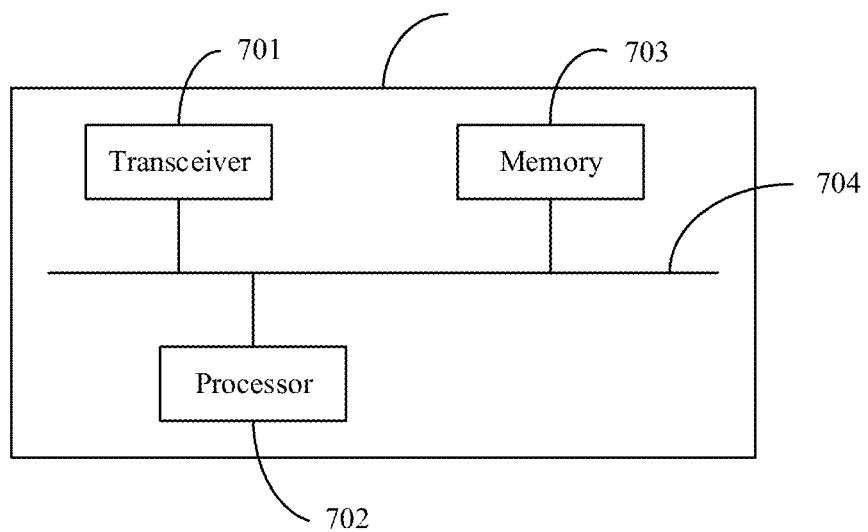
FIG. 7 is a simplified schematic diagram of a physical structure of a rate negotiation apparatus according to an embodiment of this disclosure.

FIG. 7 is a simplified schematic diagram of a physical structure of a rate negotiation apparatus according to an embodiment of this application. The rate negotiation apparatus 70 may be a first device REC, or may be a second device RE.

The rate negotiation apparatus 70 includes a transceiver 701, a processor 702, and a memory 703. The transceiver 701, the processor 702, and the memory 703 may be connected to each other through a bus 704, or may be connected to each other in another manner. A related function implemented by the transceiver unit 601 shown in FIG. 6 may be implemented by the transceiver 701. A related function implemented by the processing unit 602 shown in FIG. 6 may be implemented by one or more processors 702.

The memory 703 includes but is not limited to a random access memory (random access memory, RAM), a read-only memory (read-only memory, ROM), an erasable programmable read-only memory (erasable programmable read only memory, EPROM), or a compact disc read-only memory (compact disc read-only memory, CD-ROM). The memory 703 is configured to store related instructions and data.

The transceiver 701 is configured to send data and/or signaling, and receive data and/or signaling.

If the rate negotiation apparatus 70 is the REC in the embodiment shown in FIG. 3, the transceiver 701 may be configured to communicate with the RE, for example, perform step S303 and step S305 in the embodiment shown in FIG. 3.

If the rate negotiation apparatus 70 is the RE 1 in the embodiment shown in FIG. 3, the transceiver 701 may be configured to communicate with the REC, for example, perform step S303, step S305, step S309, and step S311 in the embodiment shown in FIG. 3.

The processor 702 may include one or more processors, for example, include one or more central processing units (central processing unit, CPU). When the processor 702 is one CPU, the CPU may be a single-core CPU or a multi-core CPU.

If the rate negotiation apparatus 70 is the REC in the embodiment shown in FIG. 3, the processor 702 may be configured to perform an operation of controlling the REC, for example, perform step S301 and step S306 in the embodiment shown in FIG. 3.

If the rate negotiation apparatus 70 is the RE 1 in the embodiment shown in FIG. 3, the processor 702 may be configured to perform an operation of controlling the RE, for example, perform step S302, step S304, step S307, and step S312 in the embodiment shown in FIG. 3.

The memory 703 is configured to store program code and data of the rate negotiation apparatus 70.

For details of the steps performed by the processor 702 and the transceiver 701, refer to the descriptions in the embodiment shown in FIG. 3. Details are not described herein again.

It may be understood that FIG. 7 shows merely a simplified design of the rate negotiation apparatus. During actual applications, the rate negotiation apparatus may further include other necessary components, including but not limited to any quantity of transceivers, processors, controllers, memories, communications units, and the like. All devices capable of implementing this application fall within the protection scope of this application.

An embodiment of this application further provides a rate negotiation system, and the rate negotiation system may include a REC and RE. The REC and the RE may be configured to implement functions of the REC and the RE in the embodiment shown in FIG. 3. For details, refer to implementation processes of the REC and the RE in FIG. 3. In the rate negotiation system, a quantity of REs is not limited, a quantity of REs adjacent to the REC is not limited, and a quantity of devices adjacent to each RE is not limited.

A person of ordinary skill in the art may understand that all or some of the procedures of the methods in the embodiments may be implemented by a computer program instructing related hardware. The program may be stored in a computer-readable storage medium. When the program is executed, the procedures of the method embodiments may be performed. The foregoing storage medium includes any medium that can store program code, such as a ROM, a random access memory RAM, a magnetic disk, or an optical disc. Another embodiment of this application provides a computer-readable storage medium. The computer-readable storage medium stores instructions. When the instructions are run on a computer, the computer is enabled to perform the methods in the foregoing aspects.

Another embodiment of this application further provides a computer program product including instructions. When the computer program product runs on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the functions, all or some of the functions may be implemented in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from one website, computer, server, or data center to another website, computer, server, or data center in a wired (for example, a coaxial cable, a fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

What is claimed is:

1. A rate negotiation method, comprising:
    switching, by a first device, a fiber transmission rate of a first port of the first device to a first fiber transmission rate based on a preset switching direction within a rotation period of a first fiber transmission rate set, wherein the first fiber transmission rate set is a set of fiber transmission rates supported by the first device, and the first fiber transmission rate set comprises the first fiber transmission rate, wherein the rotation period of the first fiber transmission rate set is a sum of time after each fiber transmission rate in the first fiber transmission rate set runs once, and wherein the preset switching direction is an order of the fiber transmission rates within the rotation period of the first fiber transmission rate set;
    sending, by the first device, a negotiation packet to a second device adjacent to the first device through the first port of the first device within a duration of the first fiber transmission rate, wherein the duration of the first fiber transmission rate is greater than or equal to a sum of a duration of all fiber transmission rates before the fiber transmission rate is switched to the first fiber transmission rate and a preset negotiation time, and wherein the duration of all fiber transmission rates before the fiber transmission rate is switched to the first fiber transmission rate is related to locations of all fiber transmission rates within the rotation period of the first fiber transmission rate set before the fiber transmission rate is switched to the first fiber transmission rate; and in response to a response packet being received from the second device through the first port of the first device within the duration of the first fiber transmission rate, controlling, by the first device, the first port of the first device to communicate with the second device based on the first fiber transmission rate.

2. The method according to claim 1, wherein in the preset switching direction, switching is performed from an $i^{th}$ fiber transmission rate to an $(i+1)^{th}$ fiber transmission rate within the rotation period of the first fiber transmission rate set, or from an $(i+1)^{th}$ fiber transmission rate to an $i^{th}$ fiber transmission rate within the rotation period of the first fiber transmission rate set, wherein i is an integer greater than or equal to 1.

3. The method according to claim 1, wherein the method further comprises:

switching, by the first device, a fiber transmission rate of a second port of the first device to a second fiber transmission rate based on the preset switching direction within the rotation period of the first fiber transmission rate set, wherein the first fiber transmission rate set comprises the second fiber transmission rate;

sending, by the first device, a negotiation packet to a third device adjacent to the first device through the second port of the first device within a duration of the second fiber transmission rate, wherein the duration of the second fiber transmission rate is greater than or equal to a sum of a duration of all fiber transmission rates before the fiber transmission rate is switched to the second fiber transmission rate and the preset negotiation time; and in response to a response packet being received from the third device through the second port of the first device within the duration of the second fiber transmission rate, controlling, by the first device, the second port of the first device to communicate with the third device based on the second fiber transmission rate.

4. The method according to claim 3, wherein the second fiber transmission rate is the same as the first fiber transmission rate.

5. The method according to claim 3, wherein the second fiber transmission rate is different from the first fiber transmission rate.

6. The method according to claim 1, wherein the method further comprises:

within a duration of a third fiber transmission rate, in response to the first device receiving a negotiation packet from a fourth device adjacent to the first device through a third port of the first device and successfully decoding the negotiation packet, controlling, by the first device, the third port of the first device to communicate with the fourth device based on the third fiber transmission rate, wherein a duration of the third fiber transmission rate is greater than or equal to a sum of a duration of all fiber transmission rates before the fiber transmission rate is switched to the third fiber transmission rate and the preset negotiation time, and the first fiber transmission rate set comprises the third fiber transmission rate; and sending, by the first device, a response packet to the fourth device through the third port of the first device.

7. A first device, comprising a processor and a transceiver, wherein:

The processor is configured to switch a fiber transmission rate of a first port of the first device to a first fiber transmission rate based on a preset switching direction within a rotation period of a first fiber transmission rate set, wherein the first fiber transmission rate set is a set of fiber transmission rates supported by the first device, and the first fiber transmission rate set comprises the first fiber transmission rate, wherein the rotation period of the first fiber transmission rate set is a sum of time after each fiber transmission rate in the first fiber transmission rate set runs once, and wherein the preset switching direction is an order of the fiber transmission rates within the rotation period of the first fiber transmission rate set;

the transceiver is configured to send a negotiation packet to a second device adjacent to the first device through the first port of the first device within a duration of the first fiber transmission rate, wherein the duration of the first fiber transmission rate is greater than or equal to a sum of a duration of all fiber transmission rates before the fiber transmission rate is switched to the first fiber transmission rate and a preset negotiation time, and wherein the duration of all fiber transmission rates before the fiber transmission rate is switched to the first fiber transmission rate is related to locations of all fiber transmission rates within the rotation period of the first fiber transmission rate set before the fiber transmission rate is switched to the first fiber transmission rate; and wherein in response to the transceiver receiving a response packet from the second device through the first port of the first device within the duration of the first fiber transmission rate, the processor is further configured to control the first port of the first device to communicate with the second device based on the first fiber transmission rate.

8. The first device according to claim 7, wherein in the preset switching direction, switching is performed from an $i^{th}$ fiber transmission rate to an $(i+1)^{th}$ fiber transmission rate within the rotation period of the first fiber transmission rate set, or from an $(i+1)^{th}$ fiber transmission rate to an $i^{th}$ fiber transmission rate within the rotation period of the first fiber transmission rate set, wherein i is an integer greater than or equal to 1.

9. The first device according to claim 7, wherein:

the processor is further configured to switch a fiber transmission rate of a second port of the first device to a second fiber transmission rate based on the preset switching direction within the rotation period of the first fiber transmission rate set, wherein the first fiber transmission rate set comprises the second fiber transmission rate; and the transceiver is further configured to send a negotiation packet to a third device adjacent to the first device through the second port of the first device within a duration of the second fiber transmission rate, wherein the duration of the second fiber transmission rate is greater than or equal to a sum of a duration of all fiber transmission rates before the fiber transmission rate is switched to the second fiber transmission rate and the preset negotiation time, wherein in response to the transceiver receiving a response packet from the third device through the second port of the first device within the duration of the second fiber transmission rate, the processor is further configured to control the second port of the first device to communicate with the third device based on the second fiber transmission rate.

10. The first device according to claim 9, wherein the second fiber transmission rate is the same as the first fiber transmission rate.

11. The first device according to claim 9, wherein the second fiber transmission rate is different from the first fiber transmission rate.

12. The first device according to claim 7, wherein:
the processor is further configured to, within a duration of a third fiber transmission rate, in response to the transceiver receiving a negotiation packet from a fourth device adjacent to the first device through a third port of the first device, and the processor successfully decoding the negotiation packet, control the third port of the first device to communicate with the fourth device based on the third fiber transmission rate, wherein a duration of the third fiber transmission rate is greater than or equal to a sum of a duration of all fiber transmission rates before the fiber transmission rate is switched to the third fiber transmission rate and the preset negotiation time, and the first fiber transmission rate set comprises the third fiber transmission rate; and
the transceiver is further configured to send a response packet to the fourth device through the third port of the first device.

13. The first device according to claim 7, wherein:
the processor is further configured to obtain a second fiber transmission rate set, wherein the second fiber transmission rate set is a set of fiber transmission rates supported by the second device;
determine a reference fiber transmission rate between the first device and the second device based on the second fiber transmission rate set; and
the transceiver is further configured to send the reference fiber transmission rate to the second device.

14. A second device, comprising a processor and a transceiver, wherein:
the processor is configured to switch a fiber transmission rate of a first port of the second device to a first fiber transmission rate based on a preset switching direction within a rotation period of a second fiber transmission rate set, wherein the second fiber transmission rate set is a set of fiber transmission rates supported by the second device, and the second fiber transmission rate set comprises the first fiber transmission rate, wherein the rotation period of the second fiber transmission rate set is a sum of time after each fiber transmission rate in the second fiber transmission rate set runs once, and wherein the preset switching direction is an order of the fiber transmission rates within the rotation period of the second fiber transmission rate set;
within a duration of the first fiber transmission rate, in response to the transceiver receiving a negotiation packet from a first device adjacent to the second device through the first port of the second device, and the processor successfully decoding the negotiation packet, control the first port of the second device to communicate with the first device based on the first fiber transmission rate, wherein the duration of the first fiber transmission rate is greater than or equal to a sum of a duration of all fiber transmission rates before the fiber transmission rate is switched to the first fiber transmission rate and a preset negotiation time s and wherein the duration of all fiber transmission rates before the fiber transmission rate is switched to the first fiber transmission rate is related to locations of all fiber transmission rates within the rotation period of the second fiber transmission rate set before the fiber transmission rate is switched to the first fiber transmission rate; and
the transceiver is further configured to send a response packet to the first device through the first port of the second device.

15. The second device according to claim 14, wherein in the preset switching direction, switching is performed from an $i^{th}$ fiber transmission rate to an $(i+1)^{th}$ fiber transmission rate within the rotation period of the second fiber transmission rate set, or from an $(i+1)^{th}$ fiber transmission rate to an $i^{th}$ fiber transmission rate within the rotation period of the second fiber transmission rate set, wherein i is an integer greater than or equal to 1.

16. The second device according to claim 14, wherein:
the processor is further configured to switch a fiber transmission rate of a second port of the second device to a second fiber transmission rate based on the preset switching direction within the rotation period of the second fiber transmission rate set; and
the transceiver is further configured to send a negotiation packet to a third device adjacent to the second device through the second port of the second device within a duration of the second fiber transmission rate, wherein the duration of the second fiber transmission rate is greater than or equal to a sum of a duration of all fiber transmission rates before the fiber transmission rate is switched to the second fiber transmission rate and the preset negotiation time,
wherein in response to the transceiver receiving a response packet from the third device through the second port of the second device within the duration of the second fiber transmission rate, the processor is further configured to control the second port of the second device to communicate with the third device based on the second fiber transmission rate.

17. The second device according to claim 16, wherein the second fiber transmission rate is the same as the first fiber transmission rate.

18. The second device according to claim 16, wherein the second fiber transmission rate is different from the first fiber transmission rate.

19. The second device according to claim 14, wherein:
the second device further comprises a memory;
the transceiver is further configured to receive a reference fiber transmission rate from the first device; and
the memory is configured to store the reference fiber transmission rate.

20. The second device according to claim 19, wherein:
the processor is further configured to start at the reference fiber transmission rate, and the transceiver is further configured to send a negotiation packet to the first device through the first port of the second device within a duration of the reference fiber transmission rate; and
in response to the transceiver receiving a response packet from the first device through the first port of the second device within the duration of the reference fiber transmission rate, the processor is further configured to control the first port of the second device to communicate with the first device based on an initial transmission rate, or
in response to the transceiver not receiving a response packet from the first device through the first port of the second device within the duration of the reference fiber transmission rate, the processor is further configured to perform a step of switching the fiber transmission rate of the first port of the second device to the first fiber transmission rate based on the preset switching direction within the rotation period of the second fiber transmission rate set.

* * * * *

UNITED STATES PATENT AND TRADEMARK OFFICE
CERTIFICATE OF CORRECTION

PATENT NO. : 11,894,991 B2
APPLICATION NO. : 17/338311
DATED : February 6, 2024
INVENTOR(S) : Ping Dong It is certified that error appears in the above-identified patent and that said Letters Patent is hereby corrected as shown below:

In the Claims

Claim 14: Column 27, Line 66: "sion rate and a preset negotiation time s and wherein the" should read -- sion rate and a preset negotiation time, and wherein the --.

Signed and Sealed this
Fourteenth Day of May, 2024

Katherine Kelly Vidal
*Director of the United States Patent and Trademark Office*